United States Patent [19]

LiDonnici

[11] 4,152,948
[45] May 8, 1979

[54] DEVICE FOR INCREASING DIAMETER OF A PULLEY

[76] Inventor: Kenneth LiDonnici, 433 E. 56th St., New York, N.Y. 10022

[21] Appl. No.: 837,086

[22] Filed: Sep. 28, 1977

[51] Int. Cl.² .................. F16H 55/36; F16H 55/52
[52] U.S. Cl. .................... 74/230.16; 403/370; 74/230.5; 74/243 DR
[58] Field of Search ............ 74/230.16, 230.5, 230.7, 74/243 DR, 446, 447, 448, 451; 403/368, 370

[56] References Cited

U.S. PATENT DOCUMENTS

| | | | |
|---|---|---|---|
| 1,343,152 | 6/1920 | Olson | 74/230.16 |
| 1,547,421 | 7/1925 | Kobert | 74/230.16 |
| 1,565,469 | 12/1925 | Kobert | 74/230.16 |
| 1,683,562 | 9/1928 | Mackert | 74/230.16 |
| 1,981,196 | 11/1934 | Riblet | 74/230.5 |
| 2,206,373 | 7/1940 | Stieber | 403/368 |
| 2,212,779 | 8/1940 | Klein | 74/230.5 |
| 2,258,513 | 10/1941 | Martinek | 74/230.5 |
| 2,689,483 | 9/1954 | Senna | 74/230.16 |
| 3,597,988 | 8/1971 | Hecketsweiler | 74/243 DR |
| 3,707,883 | 1/1973 | Kamenick | 74/230.16 |
| 3,893,779 | 7/1975 | Schroeter | 403/370 |
| 3,972,636 | 8/1976 | Peter et al. | 403/370 |

FOREIGN PATENT DOCUMENTS

| | | | |
|---|---|---|---|
| 649013 | 7/1937 | Fed. Rep. of Germany | 74/230.7 |
| 155736 | 3/1939 | Fed. Rep. of Germany | 403/370 |
| 2608630 | 9/1977 | Fed. Rep. of Germany | 403/370 |
| 1277884 | 10/1961 | France | 403/370 |

*Primary Examiner*—Samuel Scott
*Assistant Examiner*—William R. Henderson

[57] ABSTRACT

A device, for use with a pulley having a substantially cylindrical outer surface with a first circumferential belt groove therein defining a first pitch diameter, for increasing the pitch diameter to a desired second pitch diameter. The device includes a pulley rim having a substantially cylindrical inner surface configured to be received around the pulley and a substantially cylindrical outer surface having a second circumferential belt groove therein defining the desired second pitch diameter. The pulley rim is releasably clamped concentrically around the pulley by coaction with the first groove to mount same thereon thereby increasing the pitch diameter of the pulley to the second pitch diameter.

7 Claims, 4 Drawing Figures

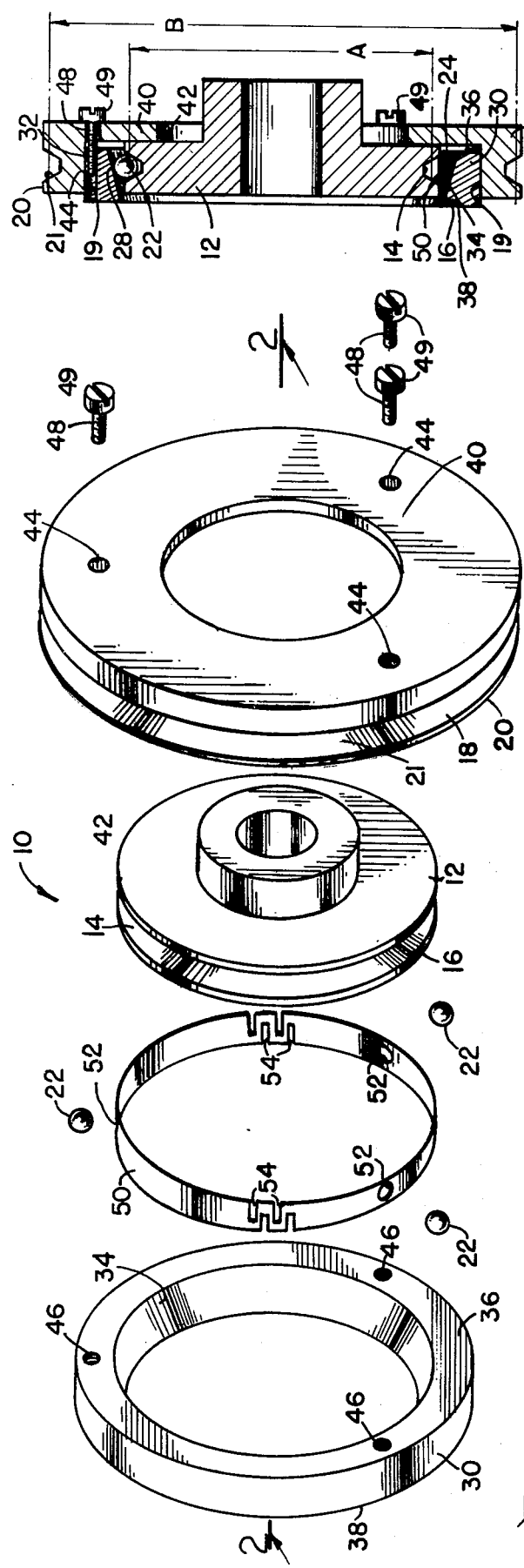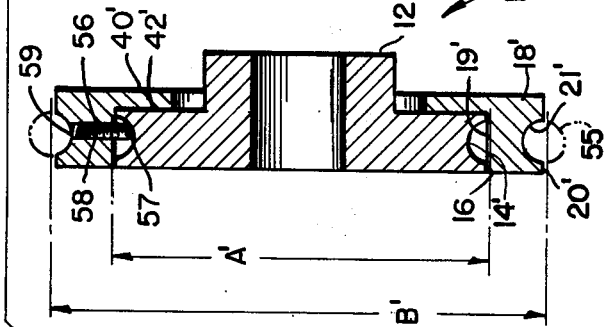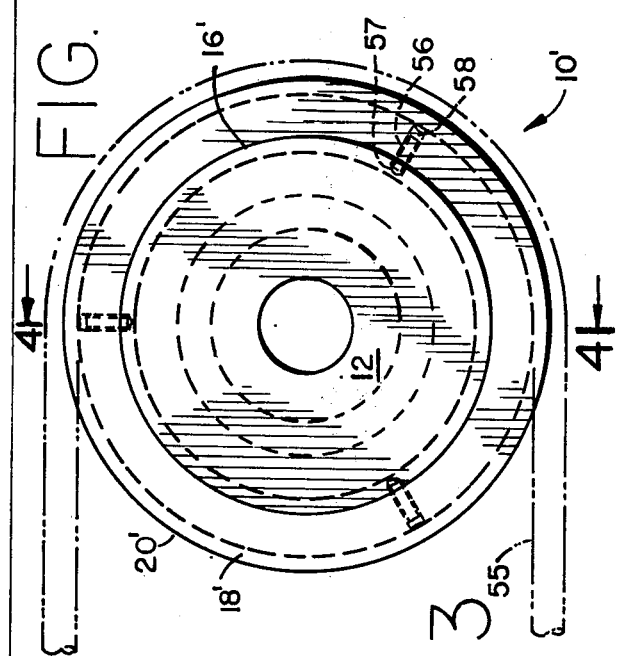

DEVICE FOR INCREASING DIAMETER OF A PULLEY

BACKGROUND OF THE INVENTION

This invention relates to devices for increasing the pitch diameter of a grooved pulley used in conjunction with a flexible power transmitting belt.

Devices for varying the pitch diameter of a pulley are well known. These devices generally comprise a pair of movable pulley flanges that are positionable relative to each other resulting in a variation in the pitch diameter as a function of the separation of the flanges. These variable pitch pulleys are costly, of complicated construction, and can only be used with "V" belts or belts of similar cross-section. No variable pitch devices are known that would accomodate other cross-sections such as round belts.

The present invention discloses a device for increasing the pitch diameter of a pulley having a V shaped groove, a semicircular groove or other configurations of grooves.

SUMMARY OF THE INVENTION

It is the principal object of this invention to provide a device for changing the pitch diameter of an existing pulley to one of a desired larger pitch diameter.

A further object is to mount the device while the existing pulley is affixed to its shaft.

A still further object is to locate the newly increased pitch diameter pulley groove in the same lateral plane as the existing pulley thereby maintaining the drive belt in its original plane.

Another object is to provide means for using a transmission belt of another cross-section by having the increased diameter pulley cooperate with the desired belt configuration.

These and other objects are achieved by the preferred embodiment of the present invention in which the pitch diameter of an existing pulley is increased by first seating at least three equally sized spherical balls in the belt groove and then fitting a locking ring over the outer periphery of the balls. The outermost radial point of the balls extends beyond the outer diameter of the existing pulley while the inner surface of the locking ring is tapered so as to provide a wedging action against the balls as the rim is axially displaced with respect to the pulley. The larger diameter of the tapered surface is greater than the outermost radial point while the smaller diameter is smaller than the outer periphery of the balls. Finally, a pulley rim having a cylindrical inner diameter and a belt groove having the desired pitch diameter formed into its outer diameter is closely received over the cylindrical outer diameter of the locking ring. The pulley rim is aligned to the existing pulley by means of a radial flange that is configured to bank against one side of the pulley. A plurality of locking screws passes through axially disposed holes in the flange in alignment with a like number of threaded holes in the narrower face of the locking ring. Tightening the screws causes the locking ring to be drawn against the flange compressing the balls into the pulley groove. The high mechanical advantage attained by the combination of the screw thread combined with the wedge-like action of the locking ring permits a secure assembly of the pulley rim to the existing pulley. The assembly provides a pulley having a larger pitch diameter than the original pulley and removeably connected thereto.

Having in mind the above and other objects that will be obvious from an understanding of the disclosure, the present invention comprises an arrangement of parts illustrated in the presently preferred embodiments of the invention which are hereinafter set forth in sufficient detail to enable those persons skilled in the art to clearly understand the function, operation, construction and advantages of it when read in conjuction with the accompanying drawing.

BRIEF DESCRIPTION OF THE DRAWING

The invention will be described in detail, by way of example, by reference to the accompanying drawing in which:

FIG. 1 is an exploded perspective of the preferred embodiment of the present invention;

FIG. 2 is a sectional view taken along line 2—2 in FIG. 1;

FIG. 3 is a front view of an alternative embodiment of the invention; and

FIG. 4 is a side sectional view taken along line 4—4 in FIG. 3.

DETAILED DESCRIPTION OF THE INVENTION

Referring to FIGS. 1 and 2 of the drawing and in accordance with the principles of the invention, a pulley assembly 10 is shown comprising a pulley 12 having a first circumferential "V" groove 14 formed into the cylindrical outer surface 16. The groove 14 is configured to accommodate a "V"-belt for transmitting mechanical power from a rotating shaft to which the pulley 12 is affixed. The belt groove 14 defines a first pitch diameter. The pitch diameter A can be increased by using the device herein disclosed.

A pulley rim 18 includes a cylindrical inner surface 19 greater than the diameter of the outer surface 16 of the pulley 12 and a cylindrical outer surface 20 that has a second circumferential belt groove 21 formed therein concentric to the inner surface 19 to define a larger second pitch diameter B. The rim 18 is radially aligned concentric to the first pitch diameter A of pulley 12 by utilizing a plurality of spherical metal balls 22.

In the case illustrated, three balls 22 preferably made of steel are seated in the groove 14 of the pulley 12 and extend into the annular space 24 having a given width formed between the outer diameter 16 of the pulley 12 and inner diameter 19 of the rim 18. The balls 22 are all of equal diameter and their outermost points 28 fall on a circumscribing diameter falling within the width of the annular space 24; the circumscribing diameter being less than the inner surface 19 of the rim 18 but greater than the outer diameter 16 of the pulley 12. A locking ring 30 has a cylindrical outer diameter 32 closely slidably receivable into the inner surface 19 of the rim 18 and a frustoconical inner surface 34 positionable around the group of balls 22.

The end of the ring 30 having the narrower cross-section 36 has a inner diameter greater than the circumscribing diameter while the end of the ring 30 having the wider cross-section 38 has an inner diameter less than the circumscribing diameter. Insertion on of the locking ring 30 into the annular space 24 allows the tapered surface 34 to contact the balls 22 and to simultanaeously position the pulley ring 18 around the pulley 12 and maintain the concentric relationships between these components. A radial flange 40 extending inwardly from one side of the rim 18 and having a length greater than the given width of the annular space 23 is configured to abut against one side 42 of the pulley 12 while aligning the first groove 14 with the second grove 21.

Three axial through apertures 44 are provided on the flange 40. The apertures all fall on a base circle of a given diameter and are equally spaced thereon. Three axial threaded holes 46 are located entering the narrow end 36 of the locking ring 30 to align with the apertures 44 through the flange 40. A screw 48 is receivable through each aligned pair of apertures 44, 46 for releasably clamping the flange to the ring 30. By engaging the screws 48 to the members described with the head portions 49 against the outer surface of the flange 40 and tightening them sequentially, the locking ring 30 is drawn toward the flange 40 as the tapered surface 34 urges the balls 22 into the belt groove 14 while simultaneously adjustably biasing the flange 40 against the one side 42 of the pulley 12 forming a new pulley assembly 10 having an increased pitch diameter. Although three locking screw members 48 are described and illustrated, any plurality may be used.

A retaining ring 50 is employed to retain the balls 22 during assembly and to space them apart in the groove 14. A series of apertures 52 equal to the number of balls 22 to be used are punched through the circumference of the ring 50. The apertures 52 are slightly smaller than the ball diameter allowing the balls 22 to be disclosed in and releasably retained between the ring 50 and the groove 14. To make this retaining ring 50 resilient enough to be expanded over the outer surface 16 of the pulley and spring back to retain the balls 22, a plurality of spaced apart notches 54 are cut axially into the ring 50. The notches 54 alternately break through one edge of the ring 50 and then the opposite edge effectively reducing the width of the ring 50 and configuring a portion thereof into a spring-like member.

An alternative construction for the retaining ring 50, not shown in the drawing, eliminates the notches 54 and replaces them with a coil spring. The retaining ring is cut across the width at a point between apertures and small holes are provided in the two free ends. Each of the holes is receptive of one end loop of the coiled extension spring, thereby giving resilience to the ring.

An alternative embodiment of the invention is shown in FIGS. 3 and 4. Here the pulley 12 is shown having a semi-circular belt groove 14' for accepting a round power transmission belt 55. Any configuration of first belt groove having outwardly sloping side walls will provide the proper geometry for the implementation of this embodiment. In this embodiment 10', the outer diameter 16 of the pulley 12 has been machined concentric with the first pitch diameter A', while the inner diameter 19' of the pulley rim 18' is closely receivable thereover. Flange 40' on rim 18'0 is configured to abut against the side 42' of the pulley 12. The outer diameter 20' of the rim 18' has second belt groove 21' associated with second pitch diameter B'.

The rim is releasably clamped by three set screws 56 each having a rounded or tapered tip 57. The screws 56 are threaded through equally spaced axial holes 58 drilled and threaded through the bottom wall 59 of the rim 18' and aligned with the side wall of the first groove 14'. The set screws have sufficient length for the tips 57 to contact the sloping sidewall closest to the flange 40' of the groove 14' while the opposite ends of the screws fall within the body of the rim 18' and cannot extend into the groove when tightened. The tip 57 of the screw 56 coacts with the sloping sidewall to bias the side 42' of the pulley 12 against the flange 40'.

In use, the pulley rim 18, 18' may be installed over a mounted pulley 12 for increasing or decreasing the rotational speed of the output shaft. For instance, one might have a fan member driven by a motor through a pair of pulleys and a power transmission belt. If it were desired to increase the fan speed to provide more cooling air, the rim 18, 18' is slipped over the motor pulley while it is still affixed to its shaft and releasably clamped thereto using the apparatus in one of the embodiments previously described. If it were required to reduce the rotational speed of an output shaft, the rim 18, 18' would be installed over the output pulley. In either case, it may be necessary to substitute a longer drive belt to compensate for the increased diameter of one of the pulleys.

Both pulleys may be increased in a case where the configuration of the belt groove 21, 21' is to be changed in favor of any other type. It should be noted that the groove 21, 21' in the rim 18, 18' need not have diverging side walls or any side walls at all since this is only a prerequisite of the first pulley 12.

If both pulleys are to be increased in diameter, the distance between the inner surface of the flange 40 and the centerline of the groove 21, 21' may be machined into rim 18, 18' to maintain the enlarged pulley assemblies 10, 10' in a desired spaced apart relationship including aligning it in the same plane as the original pulleys.

While the preferred and alternative embodiments of the invention are described it will be understood that the invention is in no way limited by these embodiments.

What is claim is:

1. A device, for use with a pulley having a substantially cylindrical outer surface with a first circumferential belt groove therein having side walls and defining a first pitch diameter, for increasing the pitch diameter to a desired second pitch diameter, said device comprising:
   a. a pulley rim having a substantially cylindrical inner surface configured to be received around the pulley and a substantially cylindrical outer surface having a second circumferential belt groove therein defining the desired second pitch diameter, wherein the diameter of the inner surface of the pulley rim is greater than the diameter of the outer surface of the pulley to defne an annular space therebetween having a given width;
   b. means for releasably clamping the pulley rim concentrically around the pulley to mount same thereon thereby increasing the pitch diameter of the pulley to the second pitch diameter comprising a radial flange extending inwardly from one side of the pulley rim and means seatable in the first groove and coative with only the side walls thereof to clamp the pulley against the radial flange, wherein the radial flange extends inwardly from one side of the pulley rim and has a length greater than said given width for abutting against one side of the pulley, wherein the seatable means comprises means disposable in the annular space and coactive with the first groove for simultaneously positioning the pulley rim concentrically around the pulley and releasably maintaining same in the concentric position, wherein the positioning and maintaining means comprises at least three spherical balls each seatable in the first groove and having the same given diameter sufficient to project the outermost radial point thereof outwardly of the first groove a given distance less than the given width, a locking ring having a substantially cylindrical outer surface configured to be closely slidably received in said pulley rim and a substantially frustoconical inner surface positionable around the balls with the narrower cross-sectional end facing the radial flange, wherein the narrower cross-sectional end has a thickness less than the distance between the outermost radial point of the balls and the inner surface of the pulley rim and the wider cross-sectional end has a thickness greater than the distance between the outermost radial point of the balls and the inner surface of the pulley rim and means for adjustably biasing the locking ring towards the flange to wedge the locking ring between the balls and the pulley rim.

2. The device according to claim 1, wherein the adjustable biasing means comprises a first plurality of axial threaded bores in the narrower cross-sectional end face of the locking ring, a second plurality of axial through-bores in said flange in alignment with the first plurality of bores and a plurality of screws each extending through one second bore and threadably engageable with one first bore and having a screw head abutting against the outer surface of the flange.

3. The device according to claim 2, wherein the first and the second plurality of bores are equally spaced around the locking ring and flange respectively.

4. The device according to claim 1, wherein the flange is spaced from the second groove to position the second groove in a desired spaced apart relationship with respect to the first groove when the flange abuts against the one side of the pulley.

5. The device according to claim 1, wherein the positioning and maintaining means further comprises means for releasably retaining the balls in a desired position around the pulley to facilitate the insertion of the locking ring between the balls and pulley rim.

6. The device according to claim 5, wherein the retaining means comprises a circular ring having means defining apertures in the circumference thereof disposed at the desired positions for the balls and receptive of the portions of the balls extending outwardly from the first groove and further comprising a plurality of spaced apart axial notches disposed between the apertures, said notches alternately extending through opposite edges of the circular ring thereby effecting a resilient portion for maintaining the ring on the pulley.

7. The device according to claim 6, wherein the apertures are disposed around the retaining ring to effect the equal spacing of the balls around the pulley.

* * * * *